UNITED STATES PATENT OFFICE.

ROBERT McKINNEY, OF DETROIT, ASSIGNOR OF TWO-THIRDS TO NOAH H. ECKLER AND HULL G. SUTTON, OF JACKSON, MICHIGAN.

PRESERVING COMPOUND.

SPECIFICATION forming part of Letters Patent No. 393,714, dated November 27, 1888.

Application filed March 26, 1888. Serial No. 268,658. (No specimens.)

*To all whom it may concern:*

Be it known that I, ROBERT McKINNEY, a citizen of the United States, residing at Detroit, in the county of Wayne and State of Michigan, have invented certain new and useful Improvements in Preserving Vegetables, Fruits, &c., of which the following is a specification.

This invention relates to new and useful improvements in preserving vegetables, fruit, and perishable articles of a like nature; and it consists in a new composition or mixture for this purpose.

In the ordinary process of evaporation it is well known that the fruit and vegetables are prepared in the following manner: The article is peeled, if necessary, then sliced, bleached, if necessary, and put in the drying-rooms, where they are submitted to a sufficient degree of heat to evaporate the moisture contained therein. In the employment of this process there are found two defects. One often met with is that the article thus prepared is liable to sour, which quickly destroys its flavor and its appearance; and a second defect is that they are apt to become moldy, which at once spoils their employment for culinary purposes and entails a great loss and waste of the articles preserved in that way.

It is the object of my invention to counteract these two defects; and to this end I improve the process of preserving by means of an intermediate step before evaporating, and which consists in passing the article as prepared for the evaporator through a preserving-fluid of a peculiar composition and especially designed to overcome the difficulties above stated.

Such a preserving-fluid is of the following composition: To prepare a quantity of about fifteen hundred pounds of the dried article, I use, say, one hundred gallons of water, ten pounds of salt, extract from five pounds of sassafras-root, (prepared by steeping and extracting in the usual manner,) and the extract from two pounds of India root, (extracted in the usual manner,) all of these ingredients being mixed together, and the article, all prepared for the evaporator, is immersed from five to ten minutes, after which it is taken out, and then allowed to drain and treated in the evaporator in the usual manner until a sufficient dryness is obtained.

It will be seen that my process of immersing it in the fluid is of such a short duration that it has nothing in common with the process of pickling, which requires that the material should be immersed for a long time. This is necessary to preserve and maintain the peculiar flavor of the article, which would otherwise be destroyed.

The article called "India root" in the above composition is known in commerce under different names, such as "galangal" root, "China" or "African" root; and I do not want to limit myself in the employment of my process to preserving vegetables or fruits, as the liquid itself is of a harmless nature. It may be even used for preserving extracts liable to decompose or ferment, and in preserving other liquids, such as cider, &c. In this instance my process consists merely in the use of a mixture as a compound to be incorporated in a suitable quantity into the liquid to be preserved.

What I claim as my invention is—

1. A mixture for preserving foods, containing in a suitable vehicle, extract of sassafras-root and galangal or India root, as specified.

2. The mixture herein described for preserving articles of a perishable nature, consisting of water, salt, extract of sassafras-root, and galangal-root, in about the proportions described.

In testimony whereof I affix my signature, in presence of two witnesses, this 14th day of March, 1888.

ROBERT McKINNEY.

Witnesses:
P. M. HULBERT,
JOHN SCHUMAN.